United States Patent [19]

Rock et al.

[11] Patent Number: 5,051,483

[45] Date of Patent: Sep. 24, 1991

[54] FLAME RESISTANT POLYETHERIMIDE RESIN BLENDS

[75] Inventors: John A. Rock, Becket, Mass.; L. Joseph Male, Old Chatham, N.Y.; Norman E. Durfee, Jr., Lansboro, Mass.

[73] Assignee: General Electric Company, Pittsfield, Mass.

[21] Appl. No.: 484,485

[22] Filed: Feb. 26, 1990

Related U.S. Application Data

[63] Continuation of Ser. No. 271,380, Nov. 14, 1988, abandoned, which is a continuation of Ser. No. 925,915, Nov. 3, 1986, abandoned.

[51] Int. Cl.$^5$ .................. C08L 69/00; C08L 79/08
[52] U.S. Cl. .................. 525/425; 525/431; 525/433; 525/436
[58] Field of Search .................. 525/431, 433, 436, 425

[56] References Cited

U.S. PATENT DOCUMENTS

| | | | |
|---|---|---|---|
| 2,999,835 | 9/1961 | Goldberg | 260/42 |
| 3,153,008 | 10/1964 | Fox | 260/47 |
| 3,334,154 | 8/1967 | Kim | 260/860 |
| 3,740,305 | 6/1973 | Hoback et al. | 161/183 |
| 3,847,867 | 11/1974 | Heath et al. | 260/47 CP |
| 3,915,926 | 10/1975 | Wambach | 260/40 R |
| 3,972,902 | 8/1976 | Heath | 260/346.3 |
| 3,983,093 | 9/1976 | Williams, III et al. | 260/47 CP |
| 4,011,279 | 3/1977 | Berger et al. | 260/824 R |
| 4,051,163 | 9/1977 | Berger | 260/448.2 N |
| 4,098,750 | 7/1978 | Mark et al. | 524/167 |
| 4,123,436 | 10/1978 | Holub et al. | 260/30.8 R |
| 4,131,575 | 12/1978 | Adelman et al. | 260/17.4 R |
| 4,281,100 | 7/1983 | Takekoski | 528/188 |
| 4,387,193 | 6/1983 | Giles | 525/431 |
| 4,390,665 | 6/1983 | Giles, Jr. | 525/180 |
| 4,393,168 | 7/1983 | Giles, Jr. | 525/66 |
| 4,395,518 | 7/1983 | Giles, Jr. | 525/180 |
| 4,417,044 | 11/1983 | Parekh | 528/179 |
| 4,430,484 | 2/1984 | Quinn | 525/425 |
| 4,468,506 | 8/1984 | Holub et al. | 525/432 |
| 4,548,997 | 10/1985 | Mellinger et al. | 525/433 |
| 4,586,997 | 5/1986 | Lee | 525/426 |
| 4,629,759 | 12/1988 | Rock | 525/66 |
| 4,673,708 | 6/1987 | Rock et al. | 525/66 |

FOREIGN PATENT DOCUMENTS

| | | |
|---|---|---|
| 131643 | 1/1985 | European Pat. Off. |
| 0186243 | 7/1986 | European Pat. Off. |
| 0224696 | 10/1987 | European Pat. Off. |
| 0266595 | 5/1988 | European Pat. Off. |
| 2236887 | 2/1975 | France |
| 8404752 | 12/1984 | PCT Int'l Appl. |

*Primary Examiner*—Ana L. Carrillo
*Attorney, Agent, or Firm*—Rothwell, Figg, Ernst & Kurz

[57] ABSTRACT

Flame resistant polymer blends contain a polyetherimide and an impact strength-enhancing amount of a siloxane-polyetherimide copolymer and a solvent resistance-enhancing amount of a polycarbonate. These blends exhibit excellent impact strengths, high heat distortion temperatures, good solvent resistance, and amenability to blow-molding, injection molding and thermoforming operations. The blends are particularly suited to the manufacture of aircraft cabin interior components.

19 Claims, No Drawings

FLAME RESISTANT POLYETHERIMIDE RESIN BLENDS

This is a continuation of application Ser. No. 271,380, filed Nov. 14, 1988, now abandoned which is a continuation of Ser. No. 925,915, filed Nov. 3, 1986, now abandoned.

BACKGROUND OF THE INVENTION

This invention relates to polymer blends which are characterized by high impact strengths, good blow moldability, good injection moldability, amenability to thermoforming, excellent solvent resistance and very low flammability. The polymer blends are particularly suited for the construction of various panels and parts for aircraft interiors.

Because of their light weight, durability and strength, engineering thermoplastics are used for the construction of many components of aircraft interiors. Components such as wall panels, overhead storage lockers, serving trays, seat backs, cabin partitions and the like are conveniently and economically fabricated by extrusion, thermoforming, injection molding and blow-molding techniques. The thermoplastic resins used in these components, therefore, should be amenable to such fabrication techniques.

Aircraft cabin interior components often are exposed to various solvents, such as detergents, cleaning solutions, paints and paint removers and the like. Such solvents and solutions may cause deterioraton, such as cracking and crazing of parts fabricated from some thermoplastic materials. It is very desirable that engineering thermoplastics used for fabricating such parts exhibit resistance to deterioration by solvents.

Recent attention to the effects of fire and smoke on survivability during aircraft mishaps has led to the promulgation of standards for the flame resistance of construction materials used for the interiors of transport category aircraft. One drawback of engineering thermoplastics conventionally used for the construction of aircraft interior components is their inability to meet the latest flammability performance standards.

Such standards are embodied in 1986 amendments to Part 25-Airworthiness Standards-Transport Category Airplanes of Title 14, Code of Federal Regulations. (See 51 *Federal Register* 26206, July 21, 1986 and 51 *Federal Register* 28322, Aug. 7, 1986.) The flammability standards are based on heat calorimetry tests developed at Ohio State University. Such tests are described in the above-cited amendments to 14 C.F.R. Part 25 and are incorporated herein by reference.

Heretofore, no conventional engineering thermoplastics, having the requisite physical properties and processing characteristics, have been able to meet the flammability standards referred to in the preceeding paragraph.

SUMMARY OF THE INVENTION

In accordance with the present invention, polymer blend compositions contain a polyetherimide, an impact strength-enhancing amount of siloxane polyetherimide copolymer and a solvent-resistance enhancing amount of a polycarbonate.

The polymer blends of this invention have been found to possess the physical and chemical resistance properties important for applications as aircraft cabin interior components. Moreover, these blends meet or exceed the rigorous flammability standards that have been established for such aircraft interior components.

DETAILED DESCRIPTION OF THE INVENTION

The polyetherimides employed in the blends of this invention are well-known injection moldable engineering thermoplastics. Polytherimides are characterized by high impact strengths, high temperature resistance and good processability. Unmodified polyetherimides have not, however, found widespread use in blow-molding applications.

The polyetherimides used for preparing the blends of this invention contain repeating groups of the formula

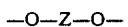

wherein "a" is an integer greater than 1, e.g., from 10 to 10,000 or more; T is —O— or a group of the formula

—O—Z—O— wherein the divalent bonds of the —O— or the —O—Z—O— group are in the 3,3'; 3,4'; 4,3', or the 4,4' positions; Z is a member of the class consisting of (A):

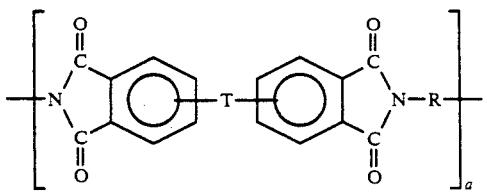

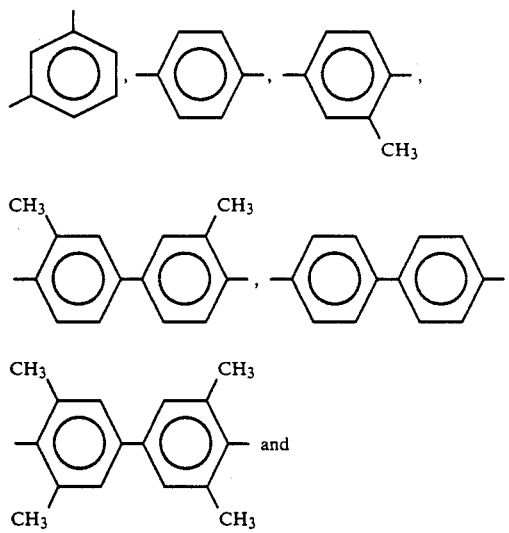

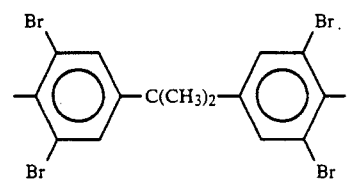

and (B) divalent organic radicals of the general formula

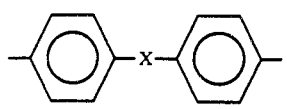

where X is a member selected from the group consisting of divalent radicals of the formulas

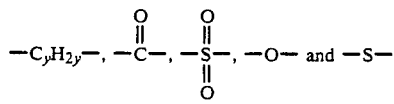

where y is an integer from 1 to about 5; and R is a divalent organic radical selected from the group consisting of (a) aromatic hydrocarbon radicals having from 6 to about 20 carbon atoms and halogenated derivatives thereof, (b) alkylene radicals having from 2 to about 20 carbon atoms, cycloalkylene radicals having from 3 to about 20 carbon atoms, and (c) divalent radicals of the general formula

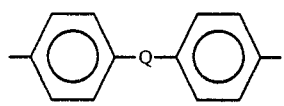

where Q is a member selected from the group consisting of

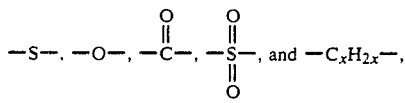

and x is an integer from 1 to about 5.

In one embodiment, the polyetherimide may be a copolymer which, in addition to the etherimide units described above, further contains polyimide repeating units of the formula

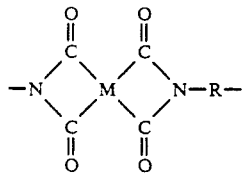

wherein R is as previously defined and M is selected from the group consisting of

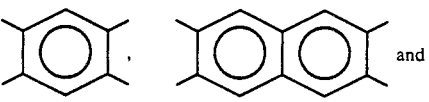

where B is —S— or

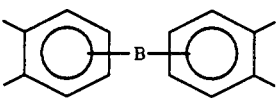

These polyetherimide copolymers and their preparation are described by Williams et al. in U.S. Pat. No. 3,983,093, incorporated herein by reference.

The polyetherimides can be prepared by any of the methods well known to those skilled in the art, including the reaction of an aromatic bis(ether anhydride) of the formula

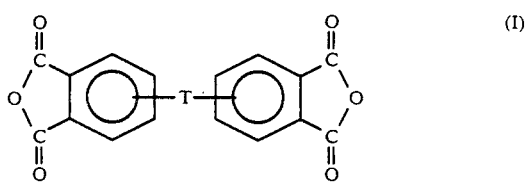

with an organic diamine of the formula $$H_2N—R—NH_2 \qquad (II)$$

wherein T and R are defined as described above.

Bis(ether anhydride)s of formula I include, for example,
1,3-bis(2,3-dicarboxyphenoxy)benzene dianhydride;
1,4-bis(2,3-dicarboxyphenoxy)benzene dianhydride;
1,3-bis(3,4-dicarboxyphenoxy)benzene dianhydride;
1,4-bis(3,4-dicarboxyphenoxy)benzene dianhydride; and
4,4'-bis(phthalic anhydride)ether.

A preferred class of aromatic bis(ether anhydride)s included by formula I includes compounds of formula III, IV and V, which follow:

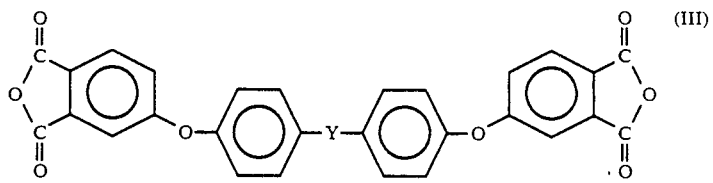

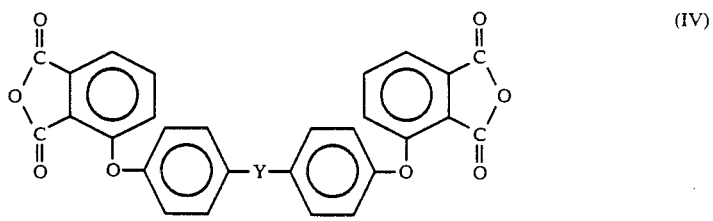

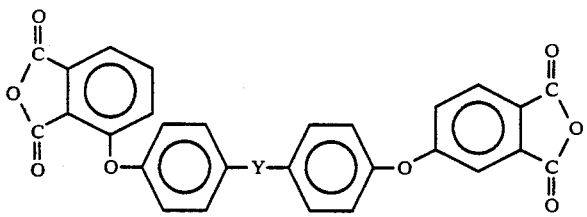

(V)

and mixtures thereof, where Y is selected from the group consisting of —O—, —S—,

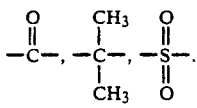

Aromatic bis(ether anhydride)s of formula III include, for example:
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4'-bis(3,4-dicarboxyphenoxy)diphenyl sulfone dianhydride; and mixtures thereof.

Aromatic bis(ether anhydride)s of formula IV include, for example:
2,2-bis([4-(2,3-dicarboxyphenoxy)phenyl]propane dianhydride;
4,4'-bis(2,3-dicarboxyphenoxy)diphenyl ether dianhydride;
4,4'-bis(2,3-dicarboxyphenoxy)diphenyl sulfide dianhydride;
4,4'-bis(2,3-diacarboxyphenoxy)benzophenone dianhydride;
4,4'-bis(2,3-dicarboxyphenoxy)diphenyl sulfone dianhydride; and mixtures thereof.

The aromatic bis(ether anhydride)s of formula V may be, for example,
4-(2,3-dicarboxyphenoxy)-4'-(3,4-dicarboxyphenoxy)diphenyl-2,2-propane dianhydride.
4-(2,3-dicarboxyphenoxy)-4'-(3,4-dicarboxyphenoxy)diphenyl ether dianhydride;
4-(2,3-dicarboxyphenoxy)-4'-(3,4-dicarboxyphenoxy)diphenyl sulfide dianhydride;
4-(2,3-dicarboxyphenoxy)-4'-(3,4-dicarboxyphenoxy)benzophenone dianhydride;
4-(2,3-dicarboxyphenoxy)-4'-(3,4-dicarboxyphenoxy)diphenyl sulfone dianhydride, and mixtures thereof.

When polyetherimide/polyimide copolymers are employed, a dianhydride, such as pyromellitic anhydride, is used in combination with the bis(ether anhydride).

Some of the aromatic bis(ether anhydride)s of formula (I) are shown in U.S. Pat. No. 3,972,902 (Darrell Heath and Joseph Wirth). As described therein, the bis(ether anhydride)s can be prepared by the hydrolysis, followed by dehydration, of the reaction product of a nitrosubstituted phenyl dinitrile with a metal salt of dihydric phenol compound in the presence of a dipolar, aprotic solvent.

Additional aromatic bis(ether anhydride)s also included by formula (I) above are shown by Koton, M. M., Florinski, F. S., Bessonov, M. I. and Rudakov, A. P. (Institute of Heteroorganic Compounds, Academy of Sciences, U.S.S.R), U.S.S.R. patent 257,010, Nov. 11, 1969, Appl. May 3, 1967, and by M. M. Koton, F. S. Florinski, *Zh. Org. Khin.* 4(5), 774 (1968).

The organic diamines of formula (II) include, for example:
m-phenylenediamine,
p-phenylenediamine,
4,4'-diaminodiphenylpropane,
4,4'-diaminodiphenylmethane (commonly named 4,4'-methylenedianiline),
4,4'-diaminodiphenyl sulfide,
4,4'-diaminodiphenyl sulfone,
4,4'-diaminodiphenyl ether (commonly named 4,4'-oxydianiline),
1,5-diaminonaphthalene,
3,3-diamethylbenzidine,
3,3-dimethoxybenzidine,
2,4-bis(beta-amino-t-butyl)toluene,
bis(p-beta-amino-t-butylphenyl)ether,
bis(p-beta-methyl-o-aminophenyl)benzene,
1,3-diamino-4-isopropylbenzene,
1,2-bis(3-aminopropoxy)ethane,
benzidine,
m-xylylenediamine,
2,4-diaminotoluene,
2,6-diaminotoluene,
bis(4-aminocyclohexyl)methane,
3-methylheptamethylenediamine,
4,4-dimethylheptamethylenediamine,
2,11-dodecanediamine,
2,2-dimethylpropylenediamine,
octamethylenediamine,
3-methoxyhexamethylenediamine,
2,5-dimethylhexamethylenediamine,
2,5-dimethylheptamethylenediamine,
3-methylheptamethylenediamine,
5-methylnonamethylenediamine,
1-4,cyclohexanediamine,
1,12-octadecanediamine,
bis(3-aminopropyl)sulfide,
N-methyl-bis(3-aminopropyl)amine,
hexamethylenediamine,
heptamethylenediamine,
nonamethylenediamine,
decamethylenediamine, and
mixtures of such diamines.

Preferred polyetherimides are available commercially from General Electric Company, Pittsfield, Mass. U.S.A. under the registered trademark, ULTEM.

The siloxane polyetherimide copolymers employed in the blends of this invention may be prepared in a manner similar to that used for polyetherimides, except that a portion or all of the organic diamine reactant is replaced by an amine-terminated organosiloxane of the formula

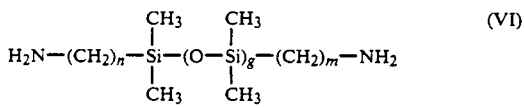

wherein n and m independently are integers from 1 to about 10, preferably from 1 to about 5, and g is an integer from 1 to about 40, preferably from about 5 to about 25.

The organic diamine of formula II and the amine-terminated organosiloxane of formula VI may be physically mixed prior to reaction with the bis(ether anhydride) (s), thus forming a substantially random copolymer. Alternatively, block or alternating copolymers may be used.

Preferred amine-terminated organosiloxanes are those of the formula VI, in which n and m are each 3, and which have a molecular weight distribution such that g has an average value ranging from about 9 to about 20.

The diamine component of the siloxane polyetherimide copolymers generally contains from about 20 to 50 mole % of the amine-terminated organosiloxane of formula VI and from about 50 to 80 mole % of the organic diamine of formula II. In preferred copolymers, the diamine component contains from about 25 to about 40 mole %, most preferably about 30 mole % of the amine-terminated organosiloxane. The siloxane polyetherimide copolymers used to practice this invention also can comprise repeating units of the general formula

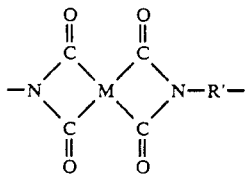

wherein M is defined as above and R' is equivalent to R as defined above or a group of the formula

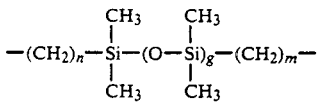

wherein n and m independently are integers from 1 to about 10 and g is an integer from 1 to about 40, preferably from about 5 to about 25.

Both the polyetherimides and the siloxane polyetherimide copolymers used in the blends of this invention may be prepared by any of the procedures conventionally used for preparing polyetherimides. A presently preferred method of preparation is described in U.S. Pat. No. 4,417,044, which is incorporated herein by reference.

The polycarbonates used in the blends of this invention are well-known, commercially available resins. They are high molecular weight, thermoplastic, aromatic polymers and include homopolycarbonates, copolycarbonates and copolyestercarbonates and mixtures thereof, which have average molecular weights of about 8,000 to more than 200,000, preferably of about 20,000 to 80,000 and an intrinsic viscosity (I.V.) of from about 0.40 to about 1.5 dl/g as measured in methylene chloride at 25 degrees C. In one embodiment, the polycarbonates are derived from dihydric phenols and carbonate precursors and generally contain recurring structural units of the formula,

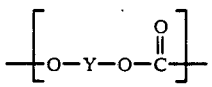

where Y is a divalent aromatic radical of the dihydric phenol employed in the polycarbonate-producing reaction.

Suitable dihydric phenols for producing polycarbonates include the dihydric phenols such as, for example, 2,2-bis(4-hydroxyphenyl)propane, bis(4-hydroxyphenyl)methane, 2,2-bis(4-hydroxy-3-methylphenyl)propane, 4,4-bis(4-hydroxyphenyl)heptane, 2,2-(3,5,3',5'-tetrachloro-4,4'-dihydroxyphenyl)propane, 2,2-(3,5,3',5'-tetrabromo-4-4'-dihydroxyphenyl)propane, and 3,3'-dichloro-4,4'-dihydroxydiphenyl)methane. Other dihydric phenols which are also suitable for use in the preparation of the above polycarbonates are disclosed in U.S. Pat. Nos. 2,999,835, 3,038,365, 3,334,154, and 4,131,575, incorporated herein by reference.

It is of course possible to employ two or more different dihydric phenols or a copolymer of a dihydric phenol with a glycol or with a hydroxy- or acid-terminated polyester, or with a dibasic acid in the event a carbonate copolymer or interpolymer rather than a homopolymer is desired for use in the preparation of the blends of this invention. Blends of any of the above materials can also be employed to provide the aromatic polycarbonate. In addition, branched polycarbonates, such as are described in U.S. Pat. No. 4,001,184, can be utilized in the practice of this invention, as can blends of a linear polycarbonate and a branched polycarbonate.

The carbonate precursor employed can be either a carbonyl halide, a carbonate ester or a haloformate. The carbonyl halides which can be employed are carbonyl bromide, carbonyl chloride and mixtures thereof. Typical of the carbonate esters which can be employed are diphenyl carbonate; a di(halophenyl)carbonate, such as di(chlorophenyl)carbonate, di(bromophenyl)carbonate, di(trichlorophenyl)carbonate, di(tribromophenyl)carbonate, etc.; a di(alkylphenyl)carbonate, such as di(tolyl)carbonate, etc.; di(naphthyl)carbonate; di(chloronaphthyl)carbonate; or mixtures thereof. The suitable haloformates include bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

The polycarbonate may also be a copolyestercarbonate, as described by Clayton B. Quinn in U.S. Pat. No. 4,430,484 and the references cited therein, incorporated herein by reference. Preferred polyestercarbonates are those derived from the dihydric phenols and carbonate precursors described above and aromatic dicarboxylic acids or their reactive derivatives, such as the acid dihalides, e.g., dichlorides. A quite useful class of aromatic polyestercarbonates are those derived from bisphenol A; terephthalic acid, isophthalic acid or a mixture thereof or their respective acid chlorides; and carbonyl chloride. If a mixture of terephthalic acid and isophthalic acid is employed, the weight ratio of terephthalic acid to isophthalic acid may be from about 5:95 to about 95:5.

The polycarbonates used in the subject blends can be manufactured by known processes, such as, for example, by reacting a dihydric phenol with a carbonate precursor such as diphenyl carbonate or carbonyl chloride in accordance with methods set forth in the above-cited literature and U.S. Pat. Nos. 4,098,750 and 4,123,436, or by transesterification techniques such as are disclosed in U.S. Pat. No. 3,153,008, as well as other processes known to those skilled in the art.

The aromatic polycarbonates are typically prepared by employing a molecular weight regulator, an acid acceptor and a catalyst. The molecular weight regulators which can be employed include phenol, cyclohexanol, methanol, alkylated phenols, such as octylphenol, para-t-butylphenol, etc. Preferably, phenol or an alkylated phenol is employed as the molecular weight regulator.

The acid acceptor can be either an organic or an inorganic acid acceptor. A suitable organic acid acceptor is a tertiary amine and includes such materials as pyridine, triethylamine, dimethylaniline, tributylamine, etc. The inorganic acid acceptor can be one which can either a hydroxide, a carbonate, a biscarbonate, or a phosphate of an alkali or alkaline earth metal.

The catalysts which can be employed are those that typically aid the polymerization of the monomer with carbonyl chloride. Suitable catalysts include tertiary amines such as triethylamine, tripropylamine, N,N-dimethylaniline, quaternary ammonium compounds, such as for example, tetraethylammonium bromide, cetyl triethylammonium bromide, tetra-n-heptylammonium iodide, tetra-n-propylammonium bromide, tetramethylammonium chloride, tetramethylammonium hydroxide, tetra-n-butylammonium iodide, benzyltrimethylammonium chloride and quaternary phosphonium compounds, such as for example, n-butyltriphenyl phosphonium bromide and methyltriphenyl phosphonium bromide.

Also included are branched polycarbonates wherein a polyfunctional aromatic compound is reacted with the monomer and carbonate precursor to provide a thermoplastic randomly branched polycarbonate. The polyfunctional aromatic compounds contain at least three functional groups which are carboxyl, carboxylic anhydride haloformyl, or mixtures thereof. Illustrative polyfunctional aromatic compounds which can be employed include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic anhydride, and the like. The preferred polyfunctional aromatic compounds are trimellitic anhydride and trimellitic acid or their acid halide derivatives.

The relative proportions of the components of the present blends may vary widely. In general, the siloxane-polyetherimide copolymer is used in an impact strength-enhancing amount. Such amounts may range, for example, from about 2% by wt. to about 40% by wt., preferably from about 5% by wt. to about 30% by wt. of the total polymer content.

Blending a siloxane-polyetherimide copolymer with a polyetherimide has been found to significantly improve several of the physical properties of the polyetherimide. In particular, the impact strength of the blend is considerably better than that of the unmodified polyetherimide. In addition, the blend is easily fabricated into useful parts by sheet extrusion, thermoforming, injection molding and blow molding. Blow molding can be an efficient and economical procedure for mass production of certain types of components. The heat distortion temperatures (HDT) of binary polyetherimide/siloxane-polyetherimide copolymer blends are unexpectedly high, especially in view of the rather low HDT's of the unblended siloxane polyetherimide copolymers. Further unexpected advantages of the polyetherimide/siloxane polyetherimide copolymer blends are their greater resistance to crack propagation and enhanced retention of impact resistance after heat aging as compared to corresponding unmodified polyetherimides. The latter property can be important in applications requiring thermoforming.

Surprisingly, the addition of a polycarbonate to a polyetherimide/siloxane-polyetherimide copolymer blend further improves the properties of the blend without sacrificing the physical properties described above. The primary benefit provided by the polycarbonate component is to impart solvent resistance to the blends. The impact strengths of the resulting blends are particularly high.

The polycarbonate is employed in the blends at a concentration sufficient to impart significant solvent resistance. Such amount generally ranges from about 5% to about 40% by weight, preferably from about 10% to about 30% by weight of the total polymer content. The polyetherimide component of the blends therefore constitutes from about 20% by wt. to about 93% by wt. of the total polymer content, depending upon the concentrations of the other polymeric ingredients.

In addition to the polymeric ingredients, the blends may contain other materials, such as fillers, additives, reinforcing agents, pigments and the like. The blends of this invention exhibit very low flammabilities. The blends meet or exceed the flammability standards of Part 25 of Title 14 of the Code of Federal Regulations. Moreover, in laboratory tests at 1/16" thickness, they were found to meet or satisfy UL 94 V-O requirements for flammability, as established by Underwriters Laboratories' "Flammability of Plastic Materials Bulletin" of Jan. 24, 1980.

Various blends have been prepared in accordance with this invention and tested for physical properties and flame resistance. The results of these tests are shown in the following examples, which are provided for illustration only and are not intended to be limiting.

EXAMPLES 1-12

Polymer blends described in Table I below were prepared by a conventional melt-blending procedure using a laboratory extruder. The blends were extruded into small diameter strands, which were chopped into pellets for further molding into test parts.

The polyetherimide resins employed in these experiments are commercially available resins, sold by General Electric Company, under the trademark, ULTEM ®. The polyetherimide employed in these experiments was homopolymer prepared by reacting 2,2-bis[4-(3,4-dicarboxyphenoxy)phenyl] propane dianhydride ("BPA-DA") and m-phenylenediamine. The siloxane polyetherimide copolymer was the reaction product of a mixture of m-phenylenediamine and an amine-terminated organosiloxane, with BPA-DA. The siloxane polyetherimide copolymer designated in Table I as type A was a random copolymer prepared from BPA-DA and a mixture of 60 mole % m-phenylenediamine and 40 mole % of an amine-terminated organosiloxane of formula VI wherein n and m are 3 and g has an average value of 9. The siloxane polyetherimide copolymer designated type B was the same as type A, except that it is a block, rather than random, copolymer. The siloxane polyetherimide copolymer designated type C was the same as type A, except that it is a block copolymer, the diamine component contains 30 mole % of the amine-terminated organosiloxane and the average value of g is 15.

The polycarbonate used in these experiments was the reaction product of bisphenol A and carbonyl chloride. It had an intrinsic viscosity of about 0.7 dl/g as measured in a chloroform solution at 25° C.

The data provided in Table I demonstrates that the blends of the present invention have unexpectedly high heat distortion temperatures, have improved impact resistance, and are amenable to blow molding. Moreover, these blends have been found to have low flammability and heat release values, thus making them particularly suited to aircraft interior component applications.

EXAMPLES 13-18

A series of sample blends was tested for solvent resistance. The results of these tests are shown in Table II below. The test procedure was designed to simulate intermittent exposure to solvents, as in cleaning, where materials and parts may be mechanically stressed as a result of fabrication conditions or techniques.

Injection molded specimens (2.5"×0.5"×0.125") were mounted on curved fixtures so that predetermined strains, and hence stress, were induced in the outer layer of the material.

The stressed surface of the specimens were then wetted with the solvents (toluene or methylethyl ketone) using a cotton-tipped applicator. The specimens were then allowed to air dry (for periods of 10 minutes to 1 hour) and the application of the solvent was repeated unless failure had already occurred. The number of hours of solvent treatment and the number of times the specimen was wiped with solvent and allowed to dry are indicated in Table II for each test specimen.

Each specimen was observed and graded according to the following system:
1—No effect
2—Only microscopic effect (Specimen appears unaffected by visual examination, but tiny surface crazes could be seen under magnification)
3—Surface disturbed
4—Visible crazing
5—Failure (specimen break)

The Polymer blends for these tests were prepared as in Examples 1-12. The polyetherimide used in these tests was the polymer designated "type A" in Examples 1-12. The siloxane polyetherimide copolymer used in Example 13 was the polymer designated "type A" in Examples 1-12, and the siloxane polyetherimide copolymer used in Examples 14-18 was the polymer designated "type B" in Examples 1-12. The polycarbonate used in these tests was the same as that used in Examples 1-12.

TABLE 1

| Example No. | Polyetherimide conc. (wt. %) | Siloxane Polyetherimide copolymer conc. (wt. %) | Siloxane Polyetherimide copolymer type | Polycarbonate conc. (wt. %) | Heat Deflection Temperature[1] at 264 psi (°C.) | Izod Impact[2] (ft.-lb/in.) Notched | Rev Notched | Blow Moldability | Dynatup ® on Blow Molded Part (ft-lb) |
|---|---|---|---|---|---|---|---|---|---|
| 1 | 65 | 5 | A | 30 | 168 | 1.02 | >16 | — | — |
| 2 | 70 | 10 | B | 20 | 179.3 | 2.40 | 73.5 | — | — |
| 3 | 70 | 15 | B | 15 | 177.6 | 2.00 | 74.2 | — | — |
| 4 | 70 | 20 | B | 10 | 174.0 | 3.70 | 65.8 | — | — |
| 5 | 50 | 10 | B | 40 | 144.9 | 5.20 | 61.4 | — | — |
| 6 | 70 | 10 | C | 20 | 179.0 | 2.70 | — | Fair-Good | 8.4 |
| 7 | 70 | 10 | B | 20 | 176.8 | 1.90 | — | Good | 2.5 |
| 8 | 70 | 20 | C | 10 | 178.4 | 11.20 | — | Good | 13.7 |
| 9[5] | 70 | 10 | C | 20 | 174.9 | 3.50 | — | Good | 1.8 |
| 10[5] | 65 | 15 | C | 20 | 176.7 | 13.60 | — | — | — |
| 11 | 85 | 15 | B | — | 191.5 | 1.6 | — | Good-Very Good | 8.7 |
| 12 | 70 | — | — | 30 | 168 | 0.9 | — | Fair | — |

| Example No. | Heat Released 2 min. total heat release | Max. heat release rate | 2 min. total smoke release | Max. smoke release rate |
|---|---|---|---|---|
| 1 | — | — | — | — |
| 2 | — | — | — | — |
| 3 | — | — | — | — |
| 4 | — | — | — | — |
| 5 | — | — | — | — |
| 6 | 38 | 85 | 54 | 117 |
| 7 | 43 | 95 | 58 | 135 |
| 8 | 52 | 91 | 93 | 162 |
| 9 | 18 | 76 | 25 | 102 |
| 10 | — | — | — | — |
| 11 | — | — | — | — |

TABLE 1-continued

| | 12 | — | — | — | — |

Footnotes to Table I
[1] Determined by ASTM procedure D648.
[2] Determined by ASTM procedure D256 (Rev. Notch test employs test bar with the notch on the side opposite impact).
[3] Dynatup ® testing measures the high-speed penetration properties of plastics using load and displacement sensors. The testing was performed substantially by ASTM procedure D3763-85 using a Dynatup ® intrument. Tests were performed on a 4" diameter, ⅛" thick injection molded disc supported by a 3" diameter support ring. Five to tem replicates of each sample were tested to determine the mean work (ft.-lb.) required to cause sample failure.
[4] Tests performed at Ohio State University according to procedures described in 14 C.F.R. Part 25. Tests were performed on 0.075-0.085 in. thick blow molded test parts.
[5] Blends contained a high level of titanium dioxide-base pigments.

TABLE 2

| Example No. | Polyether imide conc. (wt. %) | Siloxane Polyether- imide co- polymer conc. (wt. %) | Poly carbonate conc. (wt. %) | Toluene Treatment (Rating (hours/wipes)) | | | Methylethyl Ketone Treatment (Rating (hours/wipes)) | |
|---|---|---|---|---|---|---|---|---|
| | | | | at 1.09% Strain | at 0.87% Strain | at 0.69% Strain | at 1.09% Strain | at 0.87% Strain |
| 13 | 85 | 15 | — | — | 5(0.33/3) | 5(0.67/5) | — | 2(3.25/13) |
| 14 | 70 | 10 | 20 | 2(4.25/18) | — | — | 2(4.25/18) | — |
| 15 | 70 | 15 | 15 | 2(4.25/18) | — | — | 2(4.25/18) | — |
| 16 | 70 | 20 | 10 | 2(4.25/18) | — | — | 2(4.25/18) | — |
| 17 | 50 | 10 | 40 | 3(4.25/18) | — | — | 4(0.5/3) | — |
| 18 | 100 | — | — | 5(0.002/1) | 5(0.08/1) | 5(0.5/2) | 5(0.02/1) | 5(0.02/1) |

We claim:

1. A polymer blend which comprises from about 20% by wt. to about 93% by wt. of a polyetherimide, from about 2 wt. % to about 40 wt. % of a siloxane polyetherimide copolymer, and from about 5% by wt. to about 40% by wt. of a polycarbonate, wherein the polyetherimide contains repeating units of the formula

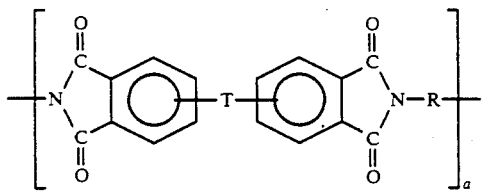

the siloxane polyetherimide copolymer consists essentially of repeating units of the formula

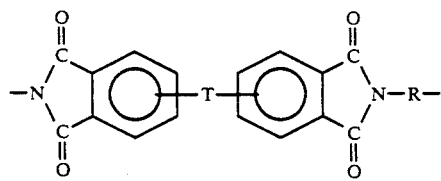

and repeating units of the formula

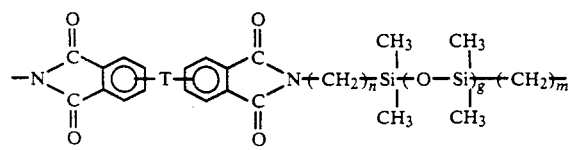

and the polycarbonate contains repeating units of the formula

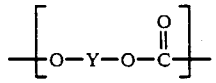

where "a" is an integer greater than 1; T is —O— or a group of the formula

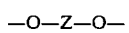

wherein the divalent bonds of the —O— or the —O—Z—O— group are in the 3,3', 3,4', 4,3' or 4,4' positions; Z is a member of the class consisting of (A):

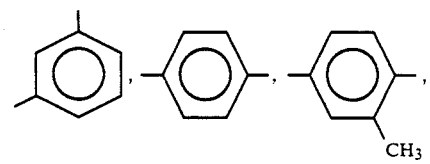

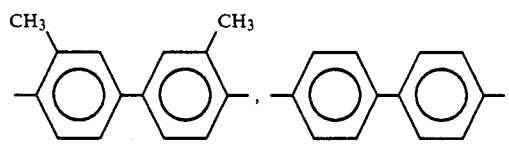

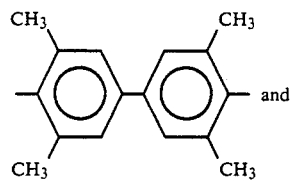
and

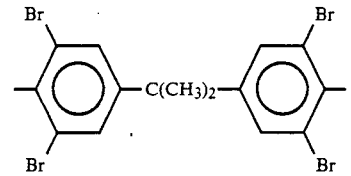

and (B) divalent organic radicals of the general formula

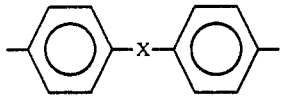

where X is a member selected from the group consisting of divalent radicals of the formulas

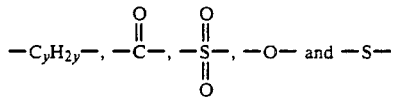

where Y is an integer from 1 to about 5; and R is a divalent organic radical selected from the group consisting of (a) aromatic hydrocarbon radicals having from 6 to about 20 carbon atoms and halogenated derivatives thereof, (b) alkylene radicals having from 2 to about 20 carbon atoms, cycloalkylene radicals having from 3 to about 20 carbon atoms, and (c) divalent radicals of the general formula

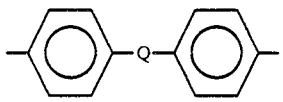

Where Q is a member selected from the group consisting of

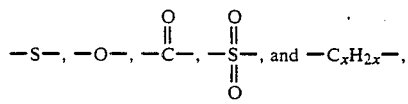

and X is an integer from 1 to about 5; n and m independently are integers from 1 to about 10 and g is an integer from 5 to about 40 and Y is a divalent aromatic radical.

2. The polymer blend of claim 1, wherein the polyetherimide further contains repeating units of the formula

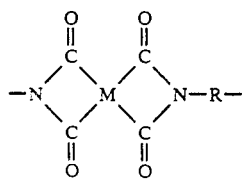

wherein R is as defined in claim 1 and M is selected from the group consisting of

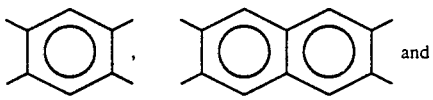

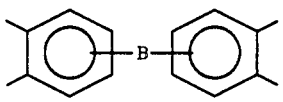

where B is —S— or

3. The polymer blend of claim 2 which contains from about 5% to about 30% by wt. of the siloxane polyetherimide copolymer, from about 10% to about 30% by wt. of the polycarbonate and from about 40% to about 85% by wt. of the polyetherimide.

4. The polymer blends of claim 1, wherein Y is a divalent aromatic residual from a dihydric phenol selected from the group consisting of 2,2-bis(4-hydroxyphenyl)-propane, bis(4-hydroxyphenyl)methane, 2,2-bis(4-hydroxy-3-methylphenyl)propane, 4,4'-bis(4-hydroxyphenyl)heptane, 2,2-(3,5,3',5'-tetrachloro-4,4'-dihydroxyphenyl)propane, 2,2-(3,5,3',5'-tetrabromo-4,4'-dihydroxyphenyl)propane and 3,3'-dichloro-4,4'-dihydroxydiphenyl)methane or mixtures thereof.

5. The polymer blend of claim 1, wherein n and m are integers from 1 to about 5.

6. The polymer blend of claim 5, wherein g has an average value from 9 to about 20.

7. The polymer blend of claim 1, wherein the organosiloxane-containing repeating unit constitutes from about 20 to about 50 mole % of the siloxane polyetherimide copolymer.

8. The polymer blend of claim 1, wherein the organosiloxane-containing repeating unit constitutes from about 25 to about 40 mole % of the siloxane polyetherimide copolymer.

9. The polymer blend of claims 2, 4 or 1, wherein the siloxane polyetherimide copolymer is a random copolymer.

10. The polymer blend of claims 2, 4 or 1, wherein the siloxane polyetherimide copolymer is a block copolymer.

11. The polymer blend of claims 2, 4 or 1, wherein the siloxane polyetherimide copolymer is an alternating copolymer.

12. The polymer blend of claims 4 or 1, which contains from about 5% to about 30% by wt. of the siloxane polyetherimide copolymer, from about 10% to about 30% by wt. of the polycarbonate and from about 40% to about 85% by wt. of the polyetherimide.

13. The polymer blend of claim 12, wherein the polyetherimide consists essentially of repeating units of the formula

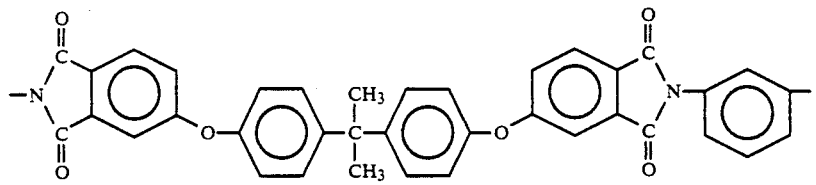

14. The polymer blend of claim 12, wherein the siloxane polyetherimide copolymer consists essentially of repeating units of the formula

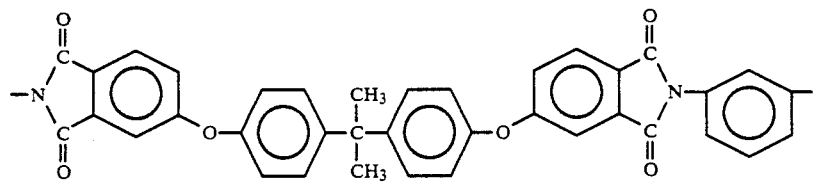

and

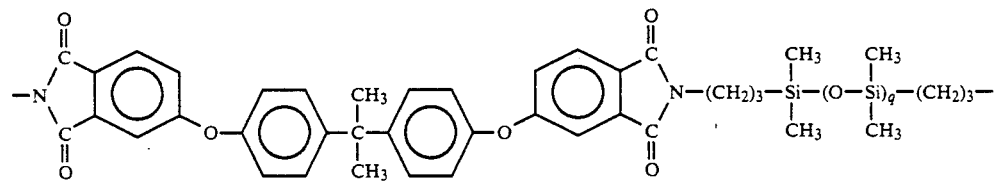

wherein g has an average value of from about 9 to about 20.

15. The polymer blend of claim 12 which further comprises pigments, reinforcing agents or mixtures thereof.

16. A polymer blend which comprise from about 20% by wt. to about 93% by wt. of a polyetherimide, from about 2 wt. % to about 40 wt. % of a siloxane polyetherimide copolymer, and from about 5% by wt. to about 40% by wt. of a polycarbonate, wherein the polyetherimide contains repeating units of the formula

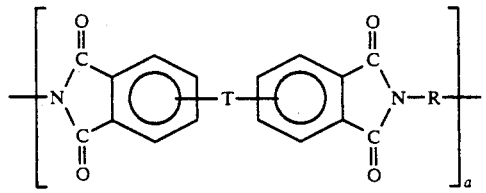

the siloxane polyetherimide copolymer consists essentially of repeating units of the formula

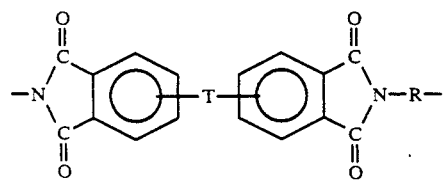

and repeating units of the formula

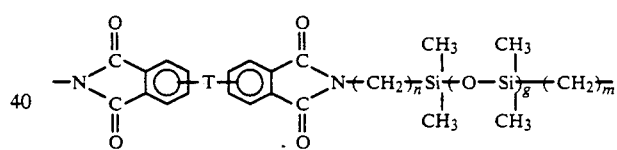

and repeating units of the formula

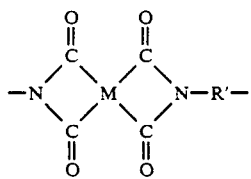

and the polycarbonate contains repeating units of the formula

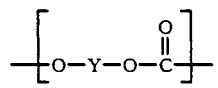

where "a" is an integer greater than 1; T is —O— or a group of the formula

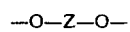

wherein the divalent bonds of the —O— or the —O—Z—O— group are in the 3,3', 3,4', 4,3' or 4,4' positions; Z is a member of the class consisting of (A);

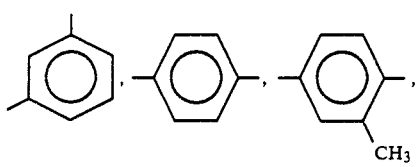

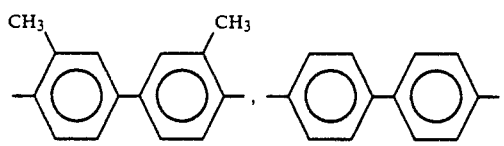

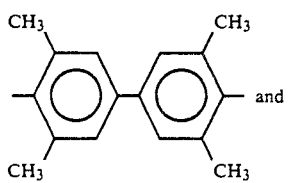 and

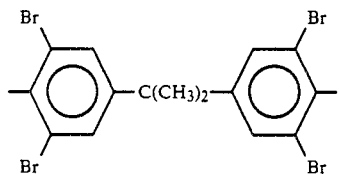

and (B) divalent organic radicals of the general formula

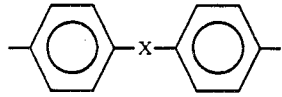

where X is a member selected from the group consisting of divalent radicals of the formula

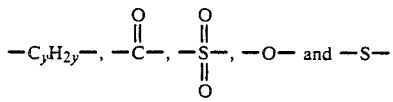

where Y is an integer from 1 to about 5; and R is a divalent organic radical selected from the group consisting of (a) aromatic hydrocarbon radicals having from 6 to about 20 carbon atoms and halogenated derivatives thereof, (b) alkylene radicals having from 3 to about 20 carbon atoms, and (c) divalent radicals of the general formula

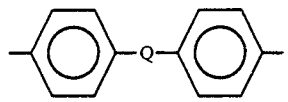

where Q is a member selected from the group consisting of

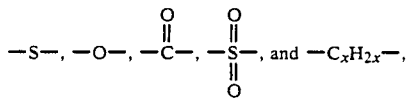

and X is an integer from 1 to about 5; n and m independently are integers from 1 to about 10 and g is an integer from 5 to about 40; M is selected from the group consisting of

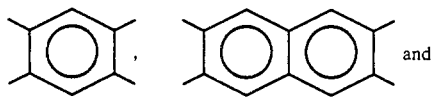

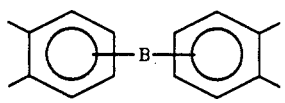

where B is —S— or

R' is R as defined above or a group of the formula

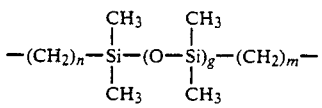

wherein n, m and g are defined as above; and Y is a divalent aromatic radical.

17. The polymer blend of claims 2, 1 or 16, wherein the polycarbonate is a polyestercarbonate derived from a dihydric phenol, a carbonate precursor and an aromatic dicarboxylic acid.

18. The polymer blend of claim 17, wherein the dihydric phenol is selected from the group consisting of 2,2-bis(4-hydroxyphenyl)propane, bis(4-hydroxyphenyl)methane, 2,2-bis(4-hydroxy-3-methylphenyl)propane, 4,4'-bis(4-hydroxyphenyl)heptane, 2,2-(3,5,3',5'-tetrachloro-4,4'-dihydroxyphenyl)propane, 2,2-(3,5,3',5'-tetrabromo-4,4'-dihydroxyphenyl)propane and 3,3'-dichloro-4,4'-dihydroxydiphenyl)methane or mixtures thereof.

19. The polymer blend of claim 18, wherein the aromatic dicarboxylic acid is terephthalic acid or isophthalic acid, or a mixture thereof.

* * * * *